United States Patent
Landers et al.

(10) Patent No.: US 10,165,756 B1
(45) Date of Patent: Jan. 1, 2019

(54) WIRELESS LOCATION ASSISTED ZONE GUIDANCE SYSTEM INCORPORATING A RAPID COLLAR MOUNT AND NON-NECROTIC STIMULATION

(71) Applicants: Rodney P. Landers, Woodbury, MN (US); Kevin L. Nieuwsma, Lakeville, MN (US); Chad R. James, Redmond, OR (US); Troy Pongratz, Minneapolis, MN (US); Robert S. Waddell, Faribault, MN (US)

(72) Inventors: Rodney P. Landers, Woodbury, MN (US); Kevin L. Nieuwsma, Lakeville, MN (US); Chad R. James, Redmond, OR (US); Troy Pongratz, Minneapolis, MN (US); Robert S. Waddell, Faribault, MN (US)

(73) Assignee: GPSIP, Inc., Oshkosh, WI (US)

( * ) Notice: Subject to any disclaimer, the term of this patent is extended or adjusted under 35 U.S.C. 154(b) by 229 days.

(21) Appl. No.: 14/662,232

(22) Filed: Mar. 18, 2015

Related U.S. Application Data

(60) Provisional application No. 61/954,598, filed on Mar. 18, 2014.

(51) Int. Cl.
  *A01K 15/00* (2006.01)
  *A01K 15/02* (2006.01)
  *A01K 11/00* (2006.01)

(52) U.S. Cl.
  CPC .......... *A01K 15/023* (2013.01); *A01K 11/008* (2013.01)

(58) Field of Classification Search
  CPC .... A01K 11/02; A01K 11/021; A01K 11/023; A01K 15/02; A01K 15/021;
  (Continued)

(56) References Cited

U.S. PATENT DOCUMENTS

| 4,393,448 A | 7/1983 | Dunn et al. |
| 4,590,569 A | 5/1986 | Rogoff et al. |

(Continued)

FOREIGN PATENT DOCUMENTS

| WO | WO 94/27268 A1 | 11/1994 |
| WO | WO 2015/021116 A1 | 9/2015 |

OTHER PUBLICATIONS

Boomerang Tags.com. (Nov. 24, 2012). Retrieved from Boomerang Tags: https://web.archive.org/web/20121124052336/http://www.boomerangtags.com/store/list.php?A=G&ID=5.*

(Continued)

*Primary Examiner* — Monica L Williams
*Assistant Examiner* — Aaron M Rodziwicz
(74) *Attorney, Agent, or Firm* — Albert W. Watkins

(57) ABSTRACT

A collar-mounted GPS and stimulation unit includes a body. Quick-mount retention clips extend from the superior and inferior lateral edges, bend in a 90 degree angle towards the center, and extend for a short distance before terminating. The preferred embodiment collar mounted GPS unit is preferably slightly wider than a standard nylon dog collar. The collar is made of a flexible material, such as nylon, leather and most other common collar materials, and can operatively be pinched to fit in between the quick-mount clips, then released to expand into normal shape within the space between the retention clips and the ends of the collar-mounted GPS and stimulation unit. A special stimulation unit is used in combination to protect the animal from harm.

9 Claims, 2 Drawing Sheets

(58) Field of Classification Search
CPC .................. A01K 15/023; A01K 11/00; A01K 11/11006; A01K 11/008
USPC ........................................................ 119/721
See application file for complete search history.

(56) References Cited

U.S. PATENT DOCUMENTS

| | | |
|---|---|---|
| 4,611,209 A | 9/1986 | Lemelson et al. |
| 4,817,000 A | 3/1989 | Eberhardt |
| 4,967,696 A | 11/1990 | Tobias |
| 4,999,782 A | 3/1991 | BeVan |
| 5,067,441 A | 11/1991 | Weinstein |
| 5,191,341 A | 3/1993 | Gouard et al. |
| 5,351,653 A | 10/1994 | Marischen et al. |
| 5,353,744 A | 10/1994 | Custer |
| 5,355,511 A | 10/1994 | Hatano et al. |
| 5,381,129 A | 1/1995 | Boardman |
| 5,389,934 A | 2/1995 | Kass |
| 5,408,956 A | 4/1995 | Quigley |
| 5,450,329 A | 9/1995 | Tanner |
| 5,491,486 A | 2/1996 | Welles, II et al. |
| 5,568,119 A * | 10/1996 | Schipper ................ G01S 19/48 340/10.41 |
| 5,587,904 A | 12/1996 | Ben-Yair et al. |
| 5,594,425 A | 1/1997 | Ladner et al. |
| 5,751,612 A | 5/1998 | Donovan et al. |
| 5,791,294 A | 8/1998 | Manning |
| 5,857,433 A | 1/1999 | Files |
| 5,868,100 A | 2/1999 | Marsh |
| 5,911,199 A | 6/1999 | Farkas et al. |
| 5,949,350 A | 9/1999 | Girard et al. |
| 6,043,748 A | 3/2000 | Touchton et al. |
| 6,079,367 A | 6/2000 | Stapelfeld et al. |
| 6,114,957 A | 9/2000 | Westrick et al. |
| 6,172,640 B1 | 1/2001 | Durst et al. |
| 6,232,880 B1 * | 5/2001 | Anderson ............ A01K 15/023 119/421 |
| 6,232,916 B1 | 5/2001 | Grillo et al. |
| 6,236,358 B1 | 5/2001 | Durst et al. |
| 6,263,836 B1 | 7/2001 | Hollis |
| 6,271,757 B1 * | 8/2001 | Touchton ............... A01K 15/02 119/721 |
| 6,313,791 B1 | 11/2001 | Klanke |
| 6,421,001 B1 | 7/2002 | Durst et al. |
| 6,441,778 B1 | 8/2002 | Durst et al. |
| 6,480,147 B2 | 11/2002 | Durst et al. |
| 6,487,992 B1 | 12/2002 | Hollis |
| 6,518,919 B1 | 2/2003 | Durst et al. |
| 6,561,137 B2 | 5/2003 | Oakman |
| 6,581,546 B1 | 6/2003 | Dalland et al. |
| 6,700,492 B2 | 3/2004 | Touchton et al. |
| 6,748,902 B1 | 6/2004 | Boesch et al. |
| 6,903,682 B1 | 6/2005 | Maddox |
| 6,923,146 B2 | 8/2005 | Kobitz et al. |
| 7,034,695 B2 | 4/2006 | Troxler |
| 7,259,718 B2 | 8/2007 | Patterson et al. |
| 7,328,671 B2 | 2/2008 | Kates |
| 7,677,204 B1 | 3/2010 | James |
| 7,764,228 B2 | 7/2010 | Durst et al. |
| 7,856,947 B2 | 12/2010 | Giunta |
| 8,065,074 B1 | 11/2011 | Liccardo |
| 8,115,642 B2 | 2/2012 | Thompson et al. |
| 8,115,942 B2 | 2/2012 | Thompson et al. |
| 8,155,871 B2 | 4/2012 | Lohi et al. |
| 8,624,723 B2 | 1/2014 | Troxler |
| 8,757,098 B2 | 6/2014 | So et al. |
| 8,797,141 B2 | 8/2014 | Best et al. |
| 8,839,744 B1 | 9/2014 | Bianchi et al. |
| 8,851,019 B2 | 10/2014 | Jesurum |
| 8,957,812 B1 | 2/2015 | Hill et al. |
| 2001/0026240 A1 * | 10/2001 | Neher ..................... G01S 5/0018 342/357.75 |
| 2004/0196182 A1 * | 10/2004 | Unnold ................. G01S 5/0027 342/357.25 |
| 2006/0027185 A1 * | 2/2006 | Troxler ................ A01K 15/023 119/721 |
| 2006/0061469 A1 | 3/2006 | Jaeger et al. |
| 2006/0197672 A1 | 9/2006 | Talamas, Jr. et al. |
| 2007/0204804 A1 | 9/2007 | Swanson et al. |
| 2008/0036610 A1 | 2/2008 | Hokuf et al. |
| 2008/0162034 A1 * | 7/2008 | Breen ..................... G01C 21/26 701/533 |
| 2008/0246656 A1 * | 10/2008 | Ghazarian ............ G08B 25/016 342/357.54 |
| 2008/0252527 A1 | 10/2008 | Garcia |
| 2009/0102668 A1 | 4/2009 | Thompson et al. |
| 2009/0267832 A1 | 10/2009 | Hymel |
| 2010/0139576 A1 | 6/2010 | Kim et al. |
| 2011/0172916 A1 | 7/2011 | Pakzad et al. |
| 2011/0193706 A1 | 8/2011 | Dickerson |
| 2012/0000431 A1 | 1/2012 | Khoshkish |
| 2013/0127658 A1 | 5/2013 | McFarland et al. |
| 2013/0157628 A1 * | 6/2013 | Kim ..................... A01K 15/023 455/414.1 |
| 2013/0307688 A1 * | 11/2013 | Hoffman ................ G08B 25/08 340/539.13 |
| 2014/0230755 A1 | 8/2014 | Trenkle et al. |
| 2015/0020750 A1 | 1/2015 | Jesurum |
| 2015/0216142 A1 | 8/2015 | Landers et al. |

OTHER PUBLICATIONS

"Boundary Plus Computer Collar Unit Owner's Manual", Invisible Fence, 10 pages.
"Global Pet Finder GPS Pet Tracker", http://www.amazon.com/Global-Pet-Finder-GPS-Tracker/, Nov. 19, 2013, 5 pages.
"Tagg-The Pet Tracker Master Kit, White by Snaptracs, Inc.", http://www.amazon.com/TAGG-The-Pet-Tracker-Guard/, Nov. 19, 2013, 5 pages.
"Boundary Plus", http://www.invisiblefence.com/find-the-right-solution/, Jan. 29, 2013, 3 pages.
"Lookup_table", http://www.Wikipedia.org/wiki/Lookup_table, Feb. 15, 2013, 10 pages.
"SkyFence: Our_Product", http://www.gpspetfence.homestead.com/resources.html, Jan 29, 2013, 3 pages.
"SkyFence: Purchase", http://www.gpspetfence.homestead.com/Purchase.html, Jan. 29, 2013, 2 pages.
"Tagg: About Us", http://www.pettracker.com/about-tagg, Jan. 29, 2013, 1 page.
"Kalman Filter", Wikipedia, https://en.wikipedia.org/wiki/Kalman_filter, Jan. 18, 2016, 37 pages.
Skinner, B. F., "Superstition in the Pigeon", Journal of Experimental Psychology, vol. 38, pp. 168-172, 1948.

\* cited by examiner

WIRELESS LOCATION ASSISTED ZONE GUIDANCE SYSTEM INCORPORATING A RAPID COLLAR MOUNT AND NON-NECROTIC STIMULATION

CROSS REFERENCE TO RELATED APPLICATIONS

This application claims the benefit under 35 U.S.C. 119(e) of U.S. provisional 61/954,598, filed Mar. 18, 2014 and herewith, the contents which are incorporated herein by reference in entirety.

BACKGROUND OF THE INVENTION

1. Field of the Invention

This invention pertains generally to electrical communications, and more particularly to condition responsive indicating systems with a radio link and including personal portable device for tracking location. The condition responsive indicating systems of the present invention monitor the specific condition of humans or animals. In one preferred manifestation, a fully self-contained collar designed in accord with the teachings of the present invention monitors the location of a pet such as a dog, and provides well defined and positive stimulus to train the pet to stay within a predetermined area.

2. Description of the Related Art

Dogs are well known as "man's best friend" owing to the many beneficial services that they provide. However, and likely since mankind first befriended dogs, there has existed a need to control the territory that a dog has access to. There are many reasons that motivate this need, many which may be relatively unique to a particular dog or owner, and other reasons that are far more universal.

Irrespective of the reason, there have been limited ways to communicate to a dog a territory that the dog should stay within, and to elicit this behavior from a dog. One method is a fixed containment structure such as a fence or building. A structure of this nature provides a physical boundary or barrier which blocks passage of an animal such as a pet or farm animal. As may be apparent, such structures are typically expensive and time consuming to install, and necessarily static in location. In other words, they are only useful at the location where they are constructed, and so are of no value when a pet and owner travel. Furthermore, these static structures often interfere in other ways with other activities of the dog owner, such as with lawn care or interfering with the owner's movement about a property. In addition, a dog may find ways to bypass the structure, such as by digging under a fence or slipping through a not-quite completely secured gate.

A second approach to controlling accessible territory is through a combination collar and leash or similar restraint. The leash is anchored to a fixed point, or in the best of situations, to a line or cable along which the dog can travel. Unfortunately, most dogs are notoriously bad at untangling or unwrapping a leash from a fixed object. Consequently, dogs tend to tangle the leash about trees, posts and other objects, and can become completely unable to move. If the owner is not aware that the dog has become tangled, this can lead to dangerous situations in cases such as extreme weather or when the dog has been left unattended for an extended period.

Additionally, some dogs are very good at escaping the leash, such as by backing away from the leash and using the leash force to slip off the collar, or by chewing through the leash. Once again, if the owner is unaware, the dog may travel from the desired area into other unsuitable areas such as roadways and the like. This may put both dog and humans in jeopardy, such as when a vehicle swerves to avoid the dog or when a dog has a temperament not suited to the general human population.

The leash also necessarily defines the region in which the dog may travel. For exemplary purposes, with a ground stake and a leash the dog is constrained to a circle. In this example, the owner will typically define the circle to the smallest radius that the dog may desirably travel within. As can be understood, for all but circularly shaped areas, this leads to a great deal of space that the dog cannot access, but which would otherwise be suitable for the dog.

In consideration of the limitations of static structures and leashes, various artisans have proposed other systems that provide more flexibility and capability, such as buried or above ground transmitter antennas and radio collars that either detect the crossing of a buried line or detect the reception or absence of reception of a signal broadcast by the transmitter antenna. When an undesirable location is detected, the radio collar is then triggered, typically to provide a painful electrical stimulation to the dog. Desirably, the electrical stimulation is mild enough not to harm the dog, but yet still strong enough to cause the dog to want to avoid additional similar stimulation. These systems remove the physical link between a dog and a static structure, meaning the dog will not get tangled in obstacles when moving about. Further, in the case of a buried line, the line may follow any geometry of land, and so is not limited to a circular pattern limited by a particular radius.

Unfortunately, burying a line can be difficult or impossible if there are other objects, such as irrigation systems, buried utility lines, landscaping, hard surfaces, trees, or other fixed objects. Additionally, current soil conditions such as frozen soil or snow-covered ground in the winter may also limit the ability to bury the line. Furthermore, the effort required to bury the line limits these systems to a single location, meaning the system cannot readily be moved or transposed from the home to a popular park or the like.

Radio systems that rely upon the detection of a signal to generate a shock, such as the buried line, are also well known to be significantly affected by static and other forms of Electro-Magnetic Interference or Radio-Frequency Interference (EMI-RFI). Consequently, a dog may be shocked or otherwise punished without basis or appropriate reason. This problem is also very location dependent, meaning that there are places where there is so much EMI-RFI that a radio system is completely unusable. As a result of the inability to completely eliminate or substantially eradicate the effects of EMI-RFI, the use of these radio systems is far from universal.

When the shock is instead triggered by the absence of a radio signal, such as when a beacon is used to contain a pet, obstacles such as buildings may prevent reception, undesirably limiting the range of travel of the animal. Furthermore, blocking the signal from the collar, such as when a dog lays down, is being caressed by the owner, or is oriented in the wrong direction, may also lead to radio signal attenuation and undesirable triggering of the shock.

As is known in the field of psychology, this random punishment that is commonplace in both types of radio systems can literally destroy the training of a dog, and may lead to erratic or wanton misbehavior. Instead, many dog owners continue to rely upon static structures or leashes to control the territory accessible by their dog.

Another problem arises when a dog unintentionally crosses a buried line. Since it is the crossing of the line that leads to the stimulation, even when the dog realizes and tries to return, the same stimulation originally keeping the dog in a containment area is now being used to keep the dog out of that containment area. Consequently, the dog will be extremely confused, and will commonly not return, even where the dog would have otherwise. As but one exemplary purpose, when a rabbit, squirrel, or other animate creature is being chased by the dog, the dog will typically be so intent on the pursuit as to completely lose track of the location of the buried line. The dog's speed may be so great that even the stimulation is very short as the dog crosses the buried line, in the heat of the chase. Furthermore, the dog's attention and focus are thoroughly directed at the pursuit of the animate creature, and even the most powerful stimulus may go unnoticed. However, once the chase is over, the dog's adrenaline or drive has diminished. A reasonably well-behaved dog will then most likely be moving more slowly back toward "home" within the containment area. Unfortunately then, the stimulation trying to re-enter will most frequently be of much longer duration, and much more recognized by the now not-distracted dog, than when the dog left the containment area. As can be appreciated, this is backwards of the intent of a training system.

With the advent and substantial advancement of Global Positioning Systems (GPS), presently primarily used for navigation, artisans have recognized the opportunity to incorporate GPS technology into pet containment. Several systems have been proposed in the literature for several decades, but these systems have not as yet become commercially viable.

One significant limitation of prior art GPS systems is the accuracy of the system. Accuracy can be dependent upon variables such as atmospheric variations, signal reflections and signal loss due to obstacles, and variability intentionally introduced into the system. Similar variability is found in various radio and cellular locating systems.

A GPS or similar navigation system that is accurate to plus or minus ten meters is very adequate for navigational purposes, for example to guide a person to a commercial building for a meeting or for other commerce. However, for pet containment this level of accuracy is completely unacceptable. For exemplary purposes, many residential yards are forty feet wide, or approximately 10 meters. A system that is only accurate to plus or minus ten meters might try to locate the dog in either neighbor's yard on any given day or at any given moment, depending upon unpredictable and uncontrollable variables such as atmospheric conditions. As will be readily appreciated, this unpredictable locating will lead to punishment of the animal when, in fact, the animal is within the proper location. In turn, this will lead to a complete failure of training, and erratic and unpredictable behavior of the animal.

Another limitation is the amount of calculation required to determine whether the pet is within a selected area of containment. Most prior art GPS systems use nodes to define the perimeter, and then mathematically calculate where the pet is relative to the nodes. Unfortunately, this requires a substantial amount of computation, which increases greatly as the number of nodes are increased. As a result, these systems commonly rely upon a primary processing system that is remote from the dog, to which the dog's collar is coupled via radio waves or the like. This permits the primary processing system to perform calculations and then relay results or control signals back to the collar. Undesirably, this also adds complexity, drains precious battery power limiting the usable collar time, and again makes the containment system dependent upon conventional radio communications systems. In addition, the need for both the collar and a secondary base station makes the system far less portable. This means, for example, that taking the dog away from home to a park may be impractical.

A further limitation of the prior art is battery life. A collar that must be removed and recharged every few hours is unacceptable for most purposes. Unfortunately, the intensive computations required by prior art systems require either a fast and consequently higher power processor unit, or a communications link such as a radio link to a base station. While the collar unit may transmit data back to the base unit to avoid the need for complex computational ability, even the transmission of position information and reception of collar actions requires a reasonably powered radio. It will be apparent that walkie-talkies, cell phones and other hand-held radio devices all have very large batteries to provide adequate transmission and reception life, and yet these devices often only support several hours of communications. As can be appreciated, size and weight are severely restricted for a device fully self-contained on a dog's collar, and the inclusion of a large battery is undesirable.

Yet another limitation of the prior art is the unintentional blocking or loss of GPS signals. There are a number of conditions that can lead to loss of GPS signals. One is unfavorable weather, which can lead to a severely attenuated satellite signal, and much higher Signal to Noise Ratios (SNR). Another condition is an adjacent building, canyon wall, or other obstacle that blocks satellite signals. Such a signal might, for exemplary purposes, either block all signals such as commonly occurs within a building, or instead may only block signals from one direction. However, GPS systems require multiple satellites to obtain a position fix, and even if only one of the satellites is blocked, then the ability to accurately fix position may be lost. Another situation that can lead to signal loss is when the collar itself is covered. This can, for exemplary and non-limiting purposes, occur when a dog lays down. If the dog lays in an unfortunate position partially or completely covering the collar, then satellite signals will be either blocked or too severely attenuated.

In any of these situations where the GPS signal is partially or completely blocked or attenuated, the latitudinal and longitudinal positional accuracy will either be inadequate, or may be completely lost. In such instances, a prior art collar may become completely non-functional. Worse, this loss of function can occur without notice in an erratic manner, possibly causing severe harm to the training of the dog.

In addition to the aforementioned limitations, prior art electronic fences have also attempted to train the animal using punishment, such as a shock, to elicit the desired behavior. As is very well known and established, negative reinforcement is less effective than positive reinforcement or a combination of positive and negative reinforcement. Furthermore, the type of reinforcement can also affect the temperament of the animal. Consequently, it is desirable to not only provide consistent behavioral reinforcement, but also to provide that reinforcement in a positive manner.

Another significant limitation of prior art systems is the size and complexity of the various pet containment systems. As a result, the prior art pet-worn containment units often require their own mounting or coupling to the pet, which may prevent a pet owner from using a particularly preferred or well-fitting collar. In other instances, the mounting itself is sufficiently complex to discourage pet owners from coupling the collar unit to the collar.

In addition, the stimulation is typically provided through a high voltage pulse applied across two prongs that are pressed into the neck of the pet. Since many animals have a relatively thick base coat, in many cases this also requires a tight collar to reliably couple the prongs into the dog. Unfortunately, if the collar is left on for extended periods, as it would desirably be for most pets, this force, any electrical stimulation, and ordinary movement of the pet will all combine to lead to gradual tissue necrosis. This can and has led to deep sores or pockets of disease within the pet's neck, which is highly inhumane and can seriously adversely affect the health and well-being of the pet.

The following patents and published patent applications are believed to be exemplary of the most relevant prior art, and the teachings and contents of each are incorporated herein by reference: U.S. Pat. No. 4,393,448 by Dunn et al, entitled "Navigational plotting system"; U.S. Pat. No. 4,590,569 by Rogoff et al, entitled "Navigation system including an integrated electronic chart display"; U.S. Pat. No. 4,611,209 by Lemelson et al, entitled "Navigation warning system and method"; U.S. Pat. No. 4,817,000 by Eberhardt, entitled "Automatic guided vehicle system"; U.S. Pat. No. 4,999,782 by BeVan, entitled "Fixed curved path waypoint transition for aircraft"; U.S. Pat. No. 5,067,441 by Weinstein, entitled "Electronic assembly for restricting animals to defined areas"; U.S. Pat. No. 5,191,341 by Gouard et al, entitled "System for sea navigation or traffic control/assistance"; U.S. Pat. No. 5,351,653 by Marischen et al, entitled "Animal training method using positive and negative audio stimuli"; U.S. Pat. No. 5,353,744 by Custer, entitled "Animal control apparatus"; U.S. Pat. No. 5,355,511 by Hatano et al, entitled "Position monitoring for communicable and uncommunicable mobile stations"; U.S. Pat. No. 5,381,129 by Boardman, entitled "Wireless pet containment system"; U.S. Pat. No. 5,389,934 by Kass, entitled "Portable locating system"; U.S. Pat. No. 5,408,956 by Quigley, entitled "Method and apparatus for controlling animals with electronic fencing"; U.S. Pat. No. 5,450,329 by Tanner, entitled "Vehicle location method and system"; U.S. Pat. No. 5,568,119 by Schipper et al, entitled "Arrestee monitoring with variable site boundaries"; U.S. Pat. No. 5,587,904 by Ben-Yair et al, entitled "Air combat monitoring system and methods and apparatus useful therefor"; U.S. Pat. No. 5,594,425 by Ladner et al, entitled "Locator device"; U.S. Pat. No. 5,751,612 by Donovan et al, entitled "System and method for accurate and efficient geodetic database retrieval"; U.S. Pat. No. 5,791,294 by Manning, entitled "Position and physiological data monitoring and control system for animal herding"; U.S. Pat. No. 5,857,433 by Files, entitled "Animal training and tracking device having global positioning satellite unit"; U.S. Pat. No. 5,868,100 by Marsh, entitled "Fenceless animal control system using GPS location information"; U.S. Pat. No. 5,911,199 by Farkas et al, entitled "Pressure sensitive animal training device"; U.S. Pat. No. 5,949,350 by Girard et al, entitled "Location method and apparatus"; U.S. Pat. No. 6,043,748 by Touchton et al, entitled "Satellite relay collar and programmable electronic boundary system for the containment of animals"; U.S. Pat. No. 6,114,957 by Westrick et al, entitled "Pet locator system"; U.S. Pat. No. 6,172,640 by Durst et al, entitled "Pet locator"; U.S. Pat. No. 6,232,880 by Anderson et al, entitled "Animal control system using global positioning and instrumental animal conditioning"; U.S. Pat. No. 6,232,916 by Grillo et al, entitled "GPS restraint system and method for confining a subject within a defined area"; U.S. Pat. No. 6,236,358 by Durst et al, entitled "Mobile object locator"; U.S. Pat. No. 6,263,836 by Hollis, entitled "Dog behavior monitoring and training apparatus"; U.S. Pat. No. 6,271,757 by Touchton et al, entitled "Satellite animal containment system with programmable Boundaries"; U.S. Pat. No. 6,313,791 by Klanke, entitled "Automotive GPS control system"; U.S. Pat. No. 6,421,001 by Durst et al, entitled "Object locator"; U.S. Pat. No. 6,441,778 by Durst et al, entitled "Pet locator"; U.S. Pat. No. 6,480,147 by Durst et al, entitled "Portable position determining device"; U.S. Pat. No. 6,487,992 by Hollis, entitled "Dog behavior monitoring and training apparatus"; U.S. Pat. No. 6,518,919 by Durst et al, entitled "Mobile object locator"; U.S. Pat. No. 6,561,137 by Oakman, entitled "Portable electronic multi-sensory animal containment and tracking device"; U.S. Pat. No. 6,581,546 by Dalland et al, entitled "Animal containment system having a dynamically changing perimeter"; U.S. Pat. No. 6,700,492 by Touchton et al, entitled "Satellite animal containment system with programmable boundaries"; U.S. Pat. No. 6,748,902 by Boesch et al, entitled "System and method for training of animals"; U.S. Pat. No. 6,903,682 by Maddox, entitled "DGPS animal containment system"; U.S. Pat. No. 6,923,146 by Kobitz et al, entitled "Method and apparatus for training and for constraining a subject to a specific area"; U.S. Pat. No. 7,034,695 by Troxler, entitled "Large area position/proximity correction device with alarms using (D)GPS technology"; U.S. Pat. No. 7,259,718 by Patterson et al, entitled "Apparatus and method for keeping pets in a defined boundary having exclusion areas"; U.S. Pat. No. 7,328,671 by Kates, entitled "System and method for computer-controlled animal toy"; U.S. Pat. No. 7,677,204 by James, entitled "Dog training device"; U.S. Pat. No. 8,155,871 by Lohi et al, entitled "Method, device, device arrangement and computer program for tracking a moving object"; U.S. Pat. No. 8,115,942 by Thompson et al, entitled "Traveling invisible electronic containment perimeter—method and apparatus"; U.S. Pat. No. 8,624,723 by Troxler, entitled "Position and proximity detection systems and methods"; U.S. Pat. No. 8,757,098 by So et al, entitled "Remote animal training system using voltage-to-frequency conversion"; U.S. Pat. No. 8,797,141 by Best et al, entitled "Reverse RFID location system"; U.S. Pat. No. 8,839,744 by Bianchi et al, entitled "Mobile telephone dog training tool and method"; U.S. Pat. No. 8,851,019 by Jesurum, entitled "Pet restraint system"; 2007/0204804 by Swanson et al, entitled "GPS pet containment system and method"; 2008/0252527 by Garcia, entitled "Method and apparatus for acquiring local position and overlaying information"; 2011/0193706 by Dickerson, entitled "Sensor collar system"; 2012/0000431 by Khoshkish, entitled "Electronic pet containment system"; 2013/0127658 by McFarland et al, entitled "Method and apparatus to determine actionable position and speed in GNSS applications"; and EP 0699330 and WO 94/27268 by Taylor, entitled "GPS Explorer".

In addition to the foregoing, Webster's New Universal Unabridged Dictionary, Second Edition copyright 1983, is incorporated herein by reference in entirety for the definitions of words and terms used herein.

OBJECTS OF THE INVENTION

The present invention and the preferred and alternative embodiments have been developed with a number of objectives in mind. While not all of these objectives are found in or required of every embodiment, these objectives nevertheless provide a sense of the general intent and the many possible benefits that are available from ones of the various embodiments of the present invention.

A first object of the invention is to provide a safe and humane apparatus for modifying the behavior of a pet. From the descriptions provided herein and the teachings incorporated by reference herein above, it will be apparent that the present invention may also be applied in certain instances to humans, livestock or other animals. A second object of the invention is to provide a fully self-contained apparatus that will determine location and provide stimuli based upon that location for extended periods of operation. As a corollary, the fully self-contained apparatus is preferably operational with universally available location systems, including but not limited to satellite GPS, cellular telephone triangulation systems, and radio triangulation system such as Loran, but may alternatively be provided with a custom location system if so desired. By using universally available location systems, there is no limit on the locations where the apparatus may be used. Another object of the present invention is to enable simple and efficient set-up and operation by a person. A further object of the invention is to efficiently and expeditiously train a pet, to significantly reduce training time and increase the effectiveness of the training. As a corollary, embodiments of the present invention will preferably provide the effective animal training while preserving the spirit and positive attitude of the animal. Yet another object of the present invention is to enable a person to set an acceptable area or "safe zone" using only the self-contained apparatus, and to adjust or redefine the area again by simple manipulation of the self-contained apparatus. An additional object of the invention is to enable the self-contained apparatus to automatically generate a number of zones that facilitate positive training and behavior modification, and thereby guide a pet or other living being appropriately.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

In a preferred embodiment of the invention, a pet owner might want to establish a containment area on an example property. Using the teachings of a related invention by the present inventors, the collar may be designed to contain an entire and independent pet containment system. In other words, no additional components would need to be purchased or acquired, nor is there a need for any other external device other than the GPS satellites. The collar will interact directly with GPS signals received from GPS satellites and may determine latitude and longitude.

In accord with the teachings of another related invention by the present inventors, and not solely limiting thereto, a comforting stimulus may be provided at particular intervals to assure or reassure the dog. Furthermore, such stimulus may be timed in accord with activity of the dog, such as when the dog is moving about and remaining within the safe zone. In such case, a comforting tone or recorded sound such as the owner's voice saying "good dog" may be periodically generated. In one embodiment contemplated herein, the velocity of the dog, including direction and speed, will also be calculated. In the event there is a danger of the dog moving outside of the safe zone, the comforting stimulus may be withheld, until the dog is confirmed to be remaining in the safe zone.

Additional zones may be identified. For exemplary purposes, these might include a "first alert" zone used to generate a vibration which is preferably very distinct from the comforting tone or "good dog" recording of the safe zone. This will preferably gently alert the dog of the transition out of the safe zone and to the need to return to the safe zone.

A "second alert" zone may be used to trigger an electrical stimulation. In the second alert zone, this stimulation may be relatively mild or medium stimulation.

Finally, at a point outside of the desired containment zone the dog may be stimulated with a stronger electrical stimulation. However, this stimulation will most preferably not continue indefinitely, which will be recognized to be quite inhumane.

Figure 1:
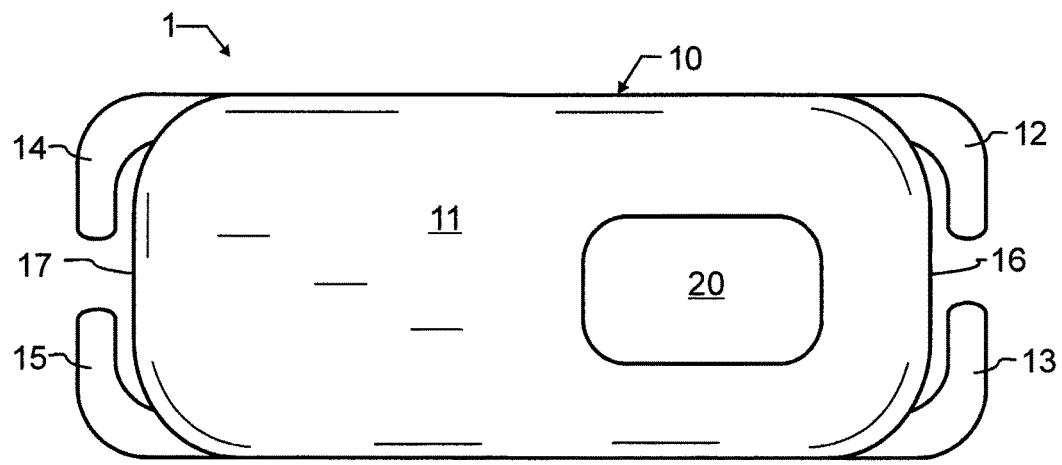
FIG. 1 illustrates a preferred embodiment collar-mounted GPS and stimulation unit from a bottom plan view designed in accord with the teachings of the present invention.
Figure 2:
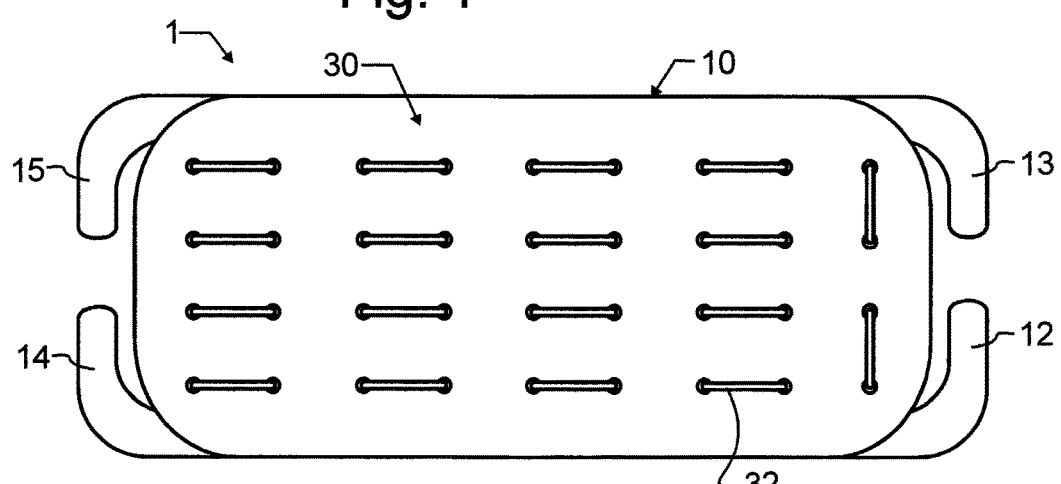
FIG. 2 illustrates the preferred embodiment collar-mounted GPS and stimulation unit of FIG. 1 from a top plan view.
Figure 3:
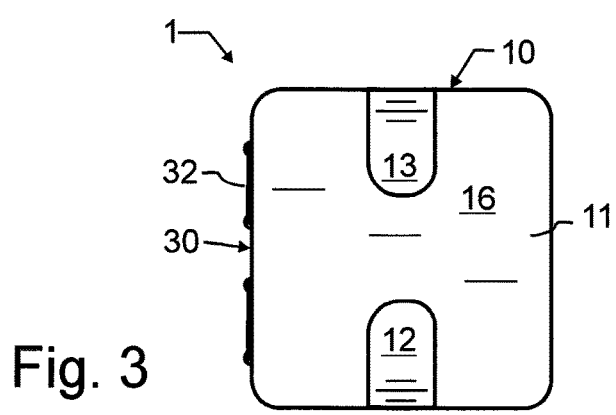
FIG. 3 illustrates the preferred embodiment collar-mounted GPS and stimulation unit of FIG. 1 from a side plan view.
Figure 5:
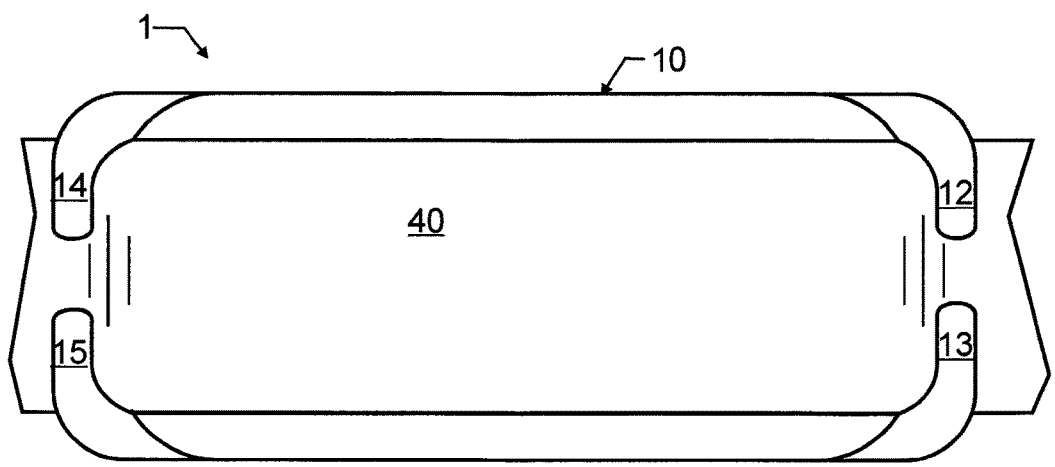
FIG. 5 illustrates the preferred embodiment collar mount from bottom plan view of FIG. 1 and additionally affixed to a dog collar.

In a preferred embodiment collar-mounted GPS and stimulation unit 1, the body 10 of the GPS unit 1 is preferably rectangular, such as illustrated in FIG. 1. On each of the two short ends 16 and 17, two protrusions 12, 13 and 14, 15 respectively, called quick-mount retention clips, preferably extend from the superior and inferior lateral edges, bend in a 90 degree angle towards the center, and extend for a short distance before terminating, as illustrated in FIGS. 1-3. The preferred embodiment GPS unit 1 is preferably slightly wider than a standard nylon dog collar, typically ¾" or 1" wide, as can be seen in FIG. 5. While not essential, the preferred embodiment GPS unit 1 is preferably not as thick as it is wide. It is preferably rounded on the long sides, and both rounded and tapered on the short sides, to avoid sharp edges that might over time abrade or harm a pet.

In the preferred embodiment collar-mounted GPS and stimulation unit 1, the quick-mount retention clips 12-15 are fabricated from the same material as body 10 of the collar-mounted GPS and stimulation unit 1. However, and where so desired, the quick-mount retention clips 12-15 may alternatively be fabricated from other suitable materials. For exemplary purposes, and not solely limiting thereto, the body and quick-mount retention clips 12-15 may be fabricated from a relatively stiff and rigid material that may range from a hard plastic to a relatively harder and stiffer elastomer or rubber-like material.

In an alternative embodiment, the body and quick-mount retention clips 12-15 may be fabricated from different materials. For exemplary purposes only, and not solely limiting thereto, the body 10 might be fabricated from a relatively stiff and rigid material, while the quick-mount retention clips 12-15 might be fabricated from a stiff but still pliable material such as an elastomer or rubber-like material. In a further alternative embodiment, the quick-mount retention clips 12-15 may be fabricated from a stiff inner core, and be provided with a more pliant and potentially more completely closed outer material.

Figure 4:
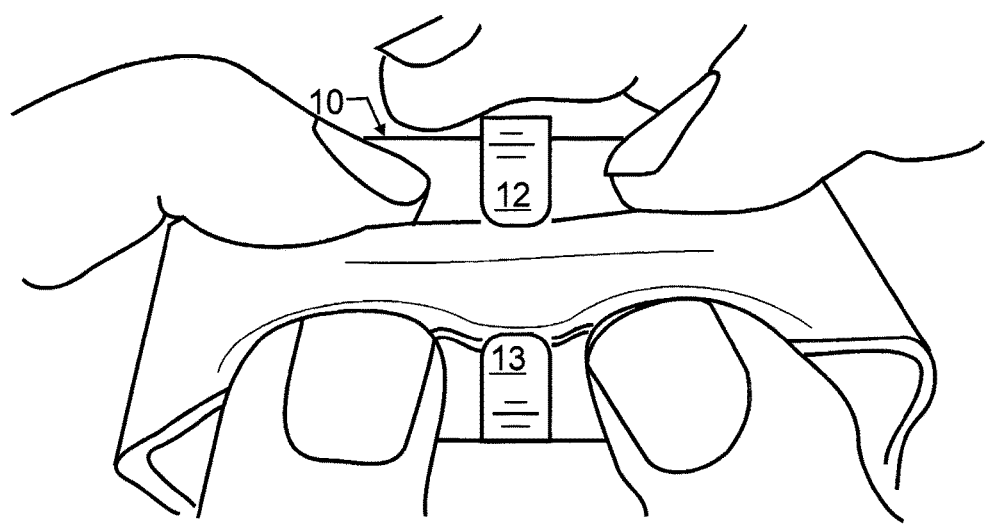
FIG. 4 illustrates the preferred embodiment collar-mounted GPS and stimulation unit of FIG. 1 from a side and slightly projected view during the collar installation process.

As can be seen in FIG. 5, when the preferred embodiment collar-mounted GPS and stimulation unit 1 is affixed to a dog collar 40, the collar 40 is held in place by the quick-mount retention clips 12-15. A collar 40 made of a flexible material, such as nylon, leather and most other common collar materials, can operatively be pinched to fit in between the quick-mount clips 12-15 as illustrated in FIG. 4, then released to expand into normal shape within the space between the retention clips 12-15 and the ends 16, 17 of the collar-mounted GPS and stimulation unit 1 to the position illustrated in FIG. 5. The use of more pliable materials for the quick-mount retention clips 12-15 will facilitate insertion, but will also increase the likelihood of separation of the collar-mounted GPS and stimulation unit 1 from the collar 40. Consequently, in the preferred embodiment, the quick-mount retention clips 12-15 are fabricated from a rigid and stiff material.

The GPS sensor 20 and associated electronics are preferably encapsulated within or inset into the body of the collar-mounted GPS and stimulation unit to protect them from potential damage.

When a person turns on or initiates the collar-mounted GPS and stimulation unit 1, the collar-mounted GPS and stimulation unit will locate satellites and determine current location. In one embodiment, the collar-mounted GPS and stimulation unit 1 may have a manual setting in order to activate or deactivate in order to save battery or to prevent stimulation at an undesired time. In a further embodiment, and in accord with the teachings of the present invention, the preferred embodiment collar-mounted GPS and stimulation unit 1 may have a sensor to detect when the device is properly secured to a dog and to then turn on the GPS unit. For exemplary purposes, fur presents a different capacitive input than open air, and in one embodiment, this may be detected by the collar electronics and used to determine that the collar-mounted GPS and stimulation unit 1 is in place on a pet's collar 40. Once detected, then the GPS electronics may be activated. Other alternative embodiments may use different detection methods, such as a pressure sensor, optical detector or other suitable apparatus to determine when the collar-mounted GPS and stimulation unit 1 is coupled to a pet.

When correction is desired, such as when a pet leaves a designated area, the device will preferably trigger an electrical stimulation. Most preferably, this electrical stimulation will be provided through a coupling 30 using electrodes 32 such as illustrated in U.S. Pat. No. 7,677,204, the teachings and contents which are incorporated herein by reference, which is considered to be a most humane method of application. The stimulation electrodes 32 will preferably be located on the top side of the collar-mounted GPS and stimulation unit 1, opposite to the views of FIGS. 1 and 5. This technology does not damage the tissue, providing non-necrotic stimulation. While much less preferable, other known techniques for electrical stimulation will be considered herein as alternative embodiments. Nevertheless, the technology illustrated in U.S. Pat. No. 7,677,204 works synergistically with the preferred quick-mount retention clips 12-15, since less force driving collar 40 into the dog is required for this stimulation technology to be effective.

While the foregoing details what are felt to be the preferred and additional alternative embodiments of the invention, no material limitations to the scope of the claimed invention are intended. The variants that would be possible from a reading of the present disclosure are too many in number for individual listings herein, though they are understood to be included in the present invention. For exemplary purposes only, and not solely limiting the invention thereto, the words "dog" and "animal" have been used interchangeably herein above. This is in recognition that the present invention has been designed specifically for use with dogs, but with the understanding that other animals may also be trained using apparatus in accord with the teachings of the present invention. Consequently, the present invention is understood to be applicable to other animals, and the differences that will be required of an alternative embodiment designed for animals other than dogs will be recognized based upon principles that are known in the art of animal training. Further, features and design alternatives that would be obvious to one of ordinary skill in the art are considered to be incorporated herein. The scope of the invention is set forth and particularly described in the claims herein below.

We claim:

1. A collar-mounted GPS and stimulation unit incorporating a rapid collar mount and non-necrotic stimulation, comprising:

a body having a first major surface, a second major surface spaced from said first major surface, a superior lateral edge adjoining said first and second major surfaces, an inferior lateral edge distal and inferior to said superior lateral edge, a first longitudinal end, and a second longitudinal end distal to said first longitudinal end;

a plurality of stimulation electrodes within an exposed electrode plane substantially parallel with and immediately adjacent to said body second major surface;

a GPS sensor and associated electronics contained within said body, wherein said associated electronics further comprises a capacitive detector coupled to said plurality of stimulation electrodes, said capacitive detector configured to detect a capacitance of fur adjacent to said plurality of stimulation electrodes when said body is properly secured to a dog and configured to turn on said GPS sensor responsive to said fur capacitance detection;

a first quick-mount retention clip extending from said superior lateral edge adjacent to said first longitudinal end to a first clip termination and defining a first gap between said first clip termination and said first longitudinal end, said first gap configured to receive and retain a first collar portion between said first quick-mount retention clip and said first longitudinal end;

a second quick-mount retention clip extending from said inferior lateral edge adjacent to said first longitudinal end to a second clip termination and defining a second gap between said second clip termination and said first longitudinal end, said second gap configured to receive and retain a second collar portion between said second quick-mount retention clip and said first longitudinal end;

said first and second clip terminations spaced from each other by a distance less than a distance between said first and second quick mount retention clips adjacent to said first longitudinal end and thereby configured to operatively entrap a collar therebetween;

a third quick-mount retention clip extending from said superior lateral edge adjacent to said second longitudinal end to a third clip termination and defining a third gap between said third clip termination and said second longitudinal end, said third gap configured to receive and retain a third collar portion between said third quick-mount retention clip and said second longitudinal end; and a fourth quick-mount retention clip extending from said inferior lateral edge adjacent to said second longitudinal end to a fourth clip termination and defining a fourth gap between said fourth clip termination and said second longitudinal end, said fourth gap configured to receive and retain a fourth collar portion between said fourth quick-mount retention clip and said second longitudinal end;

said third and fourth clip terminations spaced from each other by a distance less than a distance between said third and fourth quick mount retention clips adjacent to said second longitudinal end and thereby configured to operatively entrap said collar therebetween.

2. The collar-mounted GPS and stimulation unit incorporating a rapid collar mount and non-necrotic stimulation of claim 1, wherein said collar further comprises a flexible material having a generally rectangular cross-section, said collar configured to be deformed to a non-rectangular cross-section and subsequently inserted between said first, second, third, and fourth quick-mount retention clips, and then subsequent to said insertion be released to return to said generally rectangular cross-section within said first, second, third, and fourth gaps.

3. The collar-mounted GPS and stimulation unit incorporating a rapid collar mount and non-necrotic stimulation of claim 1, wherein said second major surface is opposed to said first major surface.

4. The collar-mounted GPS and stimulation unit incorporating a rapid collar mount and non-necrotic stimulation of claim 1, wherein said first quick-mount retention clip extends generally parallel with a longitudinal axis of said body from said superior lateral edge adjacent to said first longitudinal end and has a bend between said superior lateral edge and said first termination to thereby extend generally perpendicular to said longitudinal axis of said body between said bend and said first termination and thereby define said first gap between said first clip termination and said first longitudinal end.

5. The collar-mounted GPS and stimulation unit incorporating a rapid collar mount and non-necrotic stimulation of claim 4, wherein said bend between said superior lateral edge and said first termination further comprises a 90 degree angle.

6. The collar-mounted GPS and stimulation unit incorporating a rapid collar mount and non-necrotic stimulation of claim 1, further comprising a first major surface plane defined by said first major surface and a second major surface plane defined by said second major surface, wherein said quick-mount retention clips are located between said first and second major surface planes.

7. The collar-mounted GPS and stimulation unit incorporating a rapid collar mount and non-necrotic stimulation of claim 6, wherein said first and second major surface planes are generally parallel and spaced apart, said first and second longitudinal ends defining first and second end planes, respectively, said first and second end planes generally parallel to each other and spaced apart, said first and second end planes generally perpendicular to said first and second planes, said body and first, second, third, and fourth quick-mount retention clips configured to locate a snug collar first portion generally parallel to said second major surface plane adjacent to and displaced from said first and second quick-mount retention clips and displaced from said body, and configured to locate a snug collar second portion parallel and adjacent to said first longitudinal end, and configured to locate a snug collar third portion generally parallel to and adjacent to said first major surface plane, and configured to locate a snug collar fourth portion generally parallel and adjacent to said second longitudinal end, and configured to locate a snug collar fifth portion generally parallel to said second major surface plane adjacent to and displaced from said third and fourth quick-mount retention clips and displaced from said body.

8. The collar-mounted GPS and stimulation unit incorporating a rapid collar mount and non-necrotic stimulation of claim 1, wherein said body is a rectangular parallelepiped.

9. The collar-mounted GPS and stimulation unit incorporating a rapid collar mount and non-necrotic stimulation of claim 1, wherein said body is wider than said collar.

* * * * *